(12) United States Patent
Curts

(10) Patent No.: US 10,933,774 B2
(45) Date of Patent: Mar. 2, 2021

(54) REVERSIBLE SEAT FOR A BOAT

(71) Applicant: MasterCraft Boat Company, LLC, Vonore, TN (US)

(72) Inventor: Chadrick E. Curts, Lenoir City, TN (US)

(73) Assignee: MasterCraft Boat Company, LLC, Vonore, TN (US)

( * ) Notice: Subject to any disclaimer, the term of this patent is extended or adjusted under 35 U.S.C. 154(b) by 0 days.

(21) Appl. No.: 16/448,548

(22) Filed: Jun. 21, 2019

(65) Prior Publication Data
US 2020/0331365 A1 Oct. 22, 2020

Related U.S. Application Data

(60) Provisional application No. 62/835,184, filed on Apr. 17, 2019.

(51) Int. Cl.
*B60N 2/02* (2006.01)
*B60N 2/14* (2006.01)
*B60N 2/20* (2006.01)
*B63B 29/04* (2006.01)
*A47C 17/175* (2006.01)
(Continued)

(52) U.S. Cl.
CPC ............. *B60N 2/143* (2013.01); *B60N 2/203* (2013.01); *B63B 29/04* (2013.01); *A47C 1/028* (2013.01); *A47C 17/175* (2013.01); *A47C 17/1753* (2013.01); *A47C 17/1756* (2013.01); *B61D 33/0028* (2013.01); *B63B 2029/043* (2013.01)

(58) Field of Classification Search
CPC ............. A47C 17/175; A47C 17/1753; A47C 17/1756; A47C 1/028; B60N 2/202; B60N 2/143; B60N 2/203; B63B 29/04; B61D 33/0028

USPC .................................... 297/92, 93, 283, 2, 94
See application file for complete search history.

(56) References Cited

U.S. PATENT DOCUMENTS

| 341,319 A | * | 5/1886 | Cooke .................... A47C 1/028 297/93 |
| 2,383,178 A | | 8/1945 | Edwards |

(Continued)

FOREIGN PATENT DOCUMENTS

| EP | 1 400 400 A2 | 5/2003 |
| FR | 2 982 544 | 5/2013 |

OTHER PUBLICATIONS

MasterCraft 2019 Boat Owner's Manual, pp. cover, table of contents, 47, 49-70, 320, and 473-480.

(Continued)

*Primary Examiner* — Syed A Islam
(74) *Attorney, Agent, or Firm* — Venable LLP

(57) ABSTRACT

A reversible seat for a vehicle includes a seat structure, a support, and a pivot. The support has a slot formed therein, and the slot has an arcuate shape over a portion of the slot. The pivot is connected to the seat structure and engaged with the slot. The seat structure is configured to move from a first orientation to a second orientation by moving the pivot from a first end of the slot towards a second end of the slot and rotating the seat structure about a pivot axis of the pivot. The seat structure is also configured to move from the second orientation to the first orientation by moving the pivot from the second end of the slot towards the first end of the slot and rotating the seat structure about the pivot axis of the pivot.

22 Claims, 8 Drawing Sheets

(51) Int. Cl.
*B61D 33/00* (2006.01)
*A47C 1/028* (2006.01)

(56) References Cited

U.S. PATENT DOCUMENTS

| | | | |
|---|---|---|---|
| 2,480,552 A * | 8/1949 | Colvez | A47C 1/028 297/93 |
| 3,175,860 A * | 3/1965 | Tcherniavsky | A47C 1/028 297/93 |
| 5,056,849 A | 10/1991 | Norris, Jr. et al. | |
| 5,098,154 A | 3/1992 | Emery | |
| 7,156,442 B2 | 1/2007 | McManus et al. | |
| 7,661,382 B2 | 2/2010 | Wood et al. | |
| 7,726,730 B2 | 6/2010 | Peter et al. | |
| 10,065,711 B2 | 9/2018 | Fuller, IV et al. | |
| 10,149,544 B2 | 12/2018 | Fafard et al. | |
| 2008/0066672 A1 | 3/2008 | Eekhoff et al. | |

OTHER PUBLICATIONS

Convertible Boat Seating, 2018 Telepath Designs, available at https://www.telepathdesigns.com/selected-work/boat-seating (last visited Mar. 28, 2019).
Super Air Nautique G21; 2019, Nautique Boat Company, Inc., https://www.nautique.com/models/super-air-nautique-g21 (last visited Mar. 28, 2019).
2019 Super Air Nautique G21 Walk Through, YouTube, https://www.youtube.com/watch?time_continue=491&v=HdlzijVlbKU, Sep. 7, 2018, with images captured from about 8:00 to about 8:20.
Brochure for Single or Double Cable Latch with 2K584 T-Handle, Glassmaster Controls, available at https://www.gcontrols.com/uploads/5/6/3/7/56377313/cable_latch_systems_glassmaster_controls.pdf (last visited Jun. 18, 2019).

\* cited by examiner

REVERSIBLE SEAT FOR A BOAT

CROSS-REFERENCE TO RELATED APPLICATION

This application claims the benefit under 35 U.S.C. § 119(e) of U.S. Provisional Patent Application No. 62/835,184, filed Apr. 17, 2019, and titled "Convertible Seat." The foregoing application is hereby incorporated by reference in its entirety and is made a part of this specification for all that it discloses.

FIELD OF THE INVENTION

This invention relates to a reversible seat for a vehicle, particularly a reversible seat for a boat.

BACKGROUND OF THE INVENTION

Boats are used to tow watersports participants, such as water skiers, wakeboarders, and the like, using a tow-line. The participant holds onto one end of the tow-line and the other end is attached to the boat. A boat also may be used to generate a wake on which a watersports participant, such as a wake surfer, may wake surf. People in the boat often desire to watch the watersports participant, and in some states, a spotter is required by law. Because the watersports participant is behind the boat, it is desirable to have an aft-facing seat within a seating area of the boat. However, because space in a boat is at a premium, it is also desirable that the aft-facing seat be convertible to another orientation. For example, the aft-facing seat may be reversible between the aft-facing orientation and a forward-facing orientation. Moreover, it is also desirable that the reversible seat be of high quality, but designed for simple operation and to have relatively few parts to reduce costs.

SUMMARY OF THE INVENTION

In one aspect, the invention relates to a reversible seat for a vehicle. The reversible seat includes a seat structure moveable between a first orientation facing a first direction and a second orientation facing a second direction that is opposite the first direction. The seat structure includes a first member and a second member. The first member is configured to be (i) a seat bottom in the first orientation and (ii) a seatback in the second orientation. The second member is configured to (i) be a seatback in the first orientation and (ii) a seat bottom in the second orientation. The reversible seat also includes a support and a pivot. The support has a slot formed therein. The slot has a first end, a second end, and an arcuate shape over a portion of the slot proximate at least one of the first end and the second end. The pivot is connected to the seat structure and engaged with the slot. The pivot is moveable between the first end of the slot and the second end of the slot, and the seat structure is rotatable about a pivot axis of the pivot. The seat structure is configured to move from the first orientation to the second orientation by moving the pivot from the first end of the slot towards the second end of the slot and rotating the seat structure about the pivot axis of the pivot. The seat structure is also configured to move from the second orientation to the first orientation by moving the pivot from the second end of the slot towards the first end of the slot and rotating the seat structure about the pivot axis of the pivot.

In another aspect, the invention relates to a reversible seat for a vehicle. The reversible seat includes a seat structure moveable between a first orientation facing a first direction and a second orientation facing a second direction that is opposite the first direction. The seat structure includes a first member and a second member. The first member is configured to be (i) a seat bottom in the first orientation and (ii) a seatback in the second orientation. The second member is configured to (i) be a seatback in the first orientation and (ii) a seat bottom in the second orientation. The reversible seat also includes a pair of supports and a pair of pivots. Each pivot of the pair of pivots has a slot formed therein. The slots each extend in a direction that is parallel to each other, and each slot has (i) a first end, (ii) a second end, and (iii) an arcuate shape over a portion of the slot proximate the first end. The pair of pivots are connected to the seat structure and have a pivot axis about which the seat structure is rotatable. Each pivot is engaged with the slot of one of the pair of supports and is moveable between the first end of the corresponding slot and the second end of the corresponding slot. The seat structure is configured to move from the first orientation to the second orientation by moving the pair of pivots from the first end of each of the slots towards the second end of each of the slots and rotating the seat structure about the pivot axis of the pair of pivots. The seat structure is also configured to move from the second orientation to the first orientation by moving the pair of pivots from the second end of each of the slots towards the first end of each of the slots and rotating the seat structure about the pivot axis of the pair of pivots.

In another aspect, the invention relates to a boat. The boat includes a hull and a reversible seat. The hull includes a bow, a transom, and port and starboard sides. The reversible seat includes a seat structure moveable between a forward-facing orientation and an aft-facing orientation facing. The seat structure includes a first member and a second member. The first member is configured to be (i) a seat bottom in the forward-facing orientation and (ii) a seatback in the aft-facing orientation. The second member is configured to (i) be a seatback in the forward-facing orientation and (ii) a seat bottom in the aft-facing orientation. The second member has an end region, which is an upper portion of the second member when the seat structure is in the forward-facing orientation. The reversible seat also includes a pair of supports, a pair of pivots, and a pair of moveable arms. Each of the pair of supports has a slot formed therein. One support of the pair of supports is a port-side support located on the port side of the seat structure, and another support of the pair of supports is a starboard-side support located on the starboard side of the seat structure. Each of the slots extends in a fore and aft direction of the boat, and each slot has (i) a first end, (ii) a second end, and (iii) an arcuate shape over a portion of the slot proximate the first end. The pair of pivots have a pivot axis about which the seat structure is rotatable. One pivot of the pair of pivots is a port-side pivot located on the port side of the seat structure, and another pivot of the pair of pivots is a starboard-side pivot located on the starboard side of the seat structure. Each pivot is engaged with the slot of one of the pair of supports and is moveable between the first end of the corresponding slot and the second end of the corresponding slot. One of the pair of moveable arms is a port-side moveable arm pivotably connected to a port side of the end region of the second member, and another one of the pair of moveable arms is a starboard-side moveable arm pivotably connected to a starboard side of the end region of the second member. Each moveable arm is pivotable about an axis located on the first end side of each of the slots of the pair of supports. The seat structure is configured to move from the forward-facing orientation to the aft-facing orientation by moving the pair of pivots from the first end of each of the slots towards the second end of each of the slots and rotating the seat structure about the pivot axis of the pair of pivots. The seat structure is configured to move from the aft-facing orientation to the forward-facing orientation by moving the pair of pivots from the second end of each of the slots towards the first end of each of the slots and rotating the seat structure about the pivot axis of the pair of pivots.

These and other aspects of the invention will become apparent from the following disclosure.

BRIEF DESCRIPTION OF THE DRAWINGS

FIG. 10b is a cross-section of the support and the latch shown in FIG. 10b taken along line 10b-10b in FIG. 10a.

DETAILED DESCRIPTION OF THE PREFERRED EMBODIMENTS

As used herein, directional terms forward (fore), aft, inboard, and outboard have their commonly understood meaning in the art. Relative to the boat, forward is a direction toward the bow and aft is a direction toward the stern. Likewise, inboard is a direction toward the center of the boat and outboard is a direction away from it.

Figure 1:
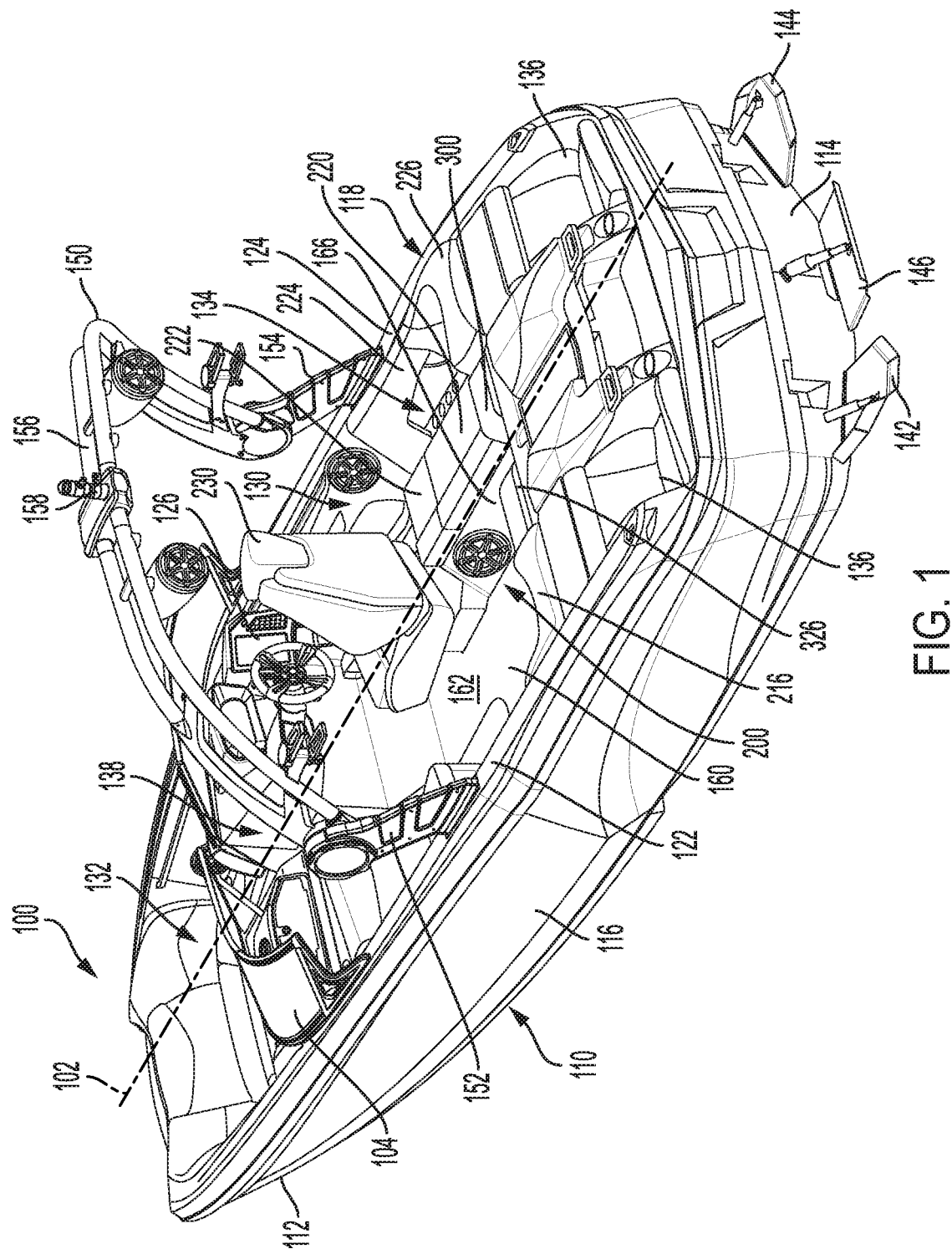
FIG. 1 shows a boat having a reversible seat in a forward-facing orientation according to a preferred embodiment of the invention.

FIG. 1 shows a boat 100 equipped with a reversible seat 300 in accordance with an exemplary preferred embodiment of the invention. Although the reversible seat 300 may be used in any type of vehicle, the reversible seat 300 is particularly suitable for use in a boat and is thus shown and described relative to the boat 100. The boat 100 includes a hull 110 with a bow 112, a transom 114, a port side 116, and a starboard side 118. The port and starboard sides 116, 118 have port and starboard gunwales 122, 124, respectively. The boat 100 has a centerline 102 running down the middle of the boat 100, halfway between the port and starboard sides 116, 118. Collectively, the bow 112, the transom 114, and the port and starboard sides 116, 118 define an interior 130 of the boat 100.

In the embodiment shown in FIG. 1, the boat 100 is a bowrider having both a bow seating area 132 positioned in the bow 112 of the boat 100 and a primary seating area 134 (sometimes also referred to as the cockpit) positioned aft of a windshield 104. A walkway 138 connects the bow seating area 132 with the primary seating area 134. The boat 100 shown in FIG. 1 also has a pair of aft-facing seats 136, such as those described in U.S. Pat. No. 9,650,117, which is incorporated by reference herein in its entirety. Also within the boat's interior 130 is a control console 126 for operating the boat 100. Here, the control console 126 is positioned on the starboard side of the boat 100 proximate to and aft of the windshield 104. The boat 100 is driven by a single inboard motor (not shown) connected to a propeller (not shown) by a drive shaft (not shown). However, this invention can be utilized with other types of boats and propulsion systems, including but not limited to outboard motors, sterndrives, and the like. Although described in reference to a bowrider this invention may be used with any suitable boat including cuddies, center consoles, and cruisers, for example.

The boat 100 of this embodiment is particularly suited for water sports and may include various features suitable for water sports. For example, the boat 100 may include a swim platform (not shown) attached to the transom 114 (or integrally formed with the stern of the boat 100) to make it easier for people to get into the water from the boat 100 or into the boat 100 from the water. The boat 100 may include the capability to add ballast. Ballast may be used to increase the weight and displacement of the boat 100 and increase the size of the wake for water sports such as wakeboarding or wake surfing. Any suitable means to add ballast may be used including ballast bags (sacks) or ballast tanks, including the ballast system shown and described in U.S. Patent Application Publication No. 2019/0118907, which is incorporated by reference herein in its entirety.

The boat 100 also may be equipped with surf devices, which may be used to shape the wake of the boat 100 for wake surfing. The surf devices 142, 144 shown in FIG. 1 may be, for example, the port and starboard wake-modifying devices disclosed in U.S. Pat. No. 8,833,286 or U.S. Patent Application Publication No. 2018/0370,601 (the '601 application), which are incorporated by reference herein in their entirety. The boat 100 may be equipped with any suitable surf device, however, including, for example, the port and starboard wake-modifying devices which are part of the swim platform disclosed in U.S. Pat. No. 9,802,684, which is incorporated by reference herein in its entirety. As shown in FIG. 1, the boat 100 also is equipped with a central trim device (center tab 146) positioned to span the centerline 102 of the boat 100. Any suitable trim device may be used, including, for example, those shown and described in the '601 application.

The boat 100 may further be equipped with an apparatus for towing a water sports participant. As shown in FIG. 1, the towing apparatus is a tower 150 that is particularly suitable for towing a wakeboarder. Any suitable tower 150 may be used, including, for example, those described in U.S. Pat. Nos. 9,580,155 and 10,150,540, which are incorporated by reference herein in their entireties. The tower 150 includes two legs: a port leg 152 and a starboard leg 154. The port leg 152 is attached on the port side of the centerline 102 of the boat 100, and the starboard leg 154 is attached on the starboard side of the centerline 102 of the boat 100. Preferably, the port and starboard legs 152, 154 are attached to the port gunwale 122 and to the starboard gunwale 124, respectively. The tower 150 also includes a header 156. The header 156 is connected to an upper portion of each of the two legs 152, 154 and spans the interior 130 of the boat 100 at a height suitable for passengers to pass underneath while standing. In addition, the tower 150 has a tow-line-attachment structure 158 at an upper portion of the tower 150 (the header 156 in this embodiment). This tow-line-attachment structure 158 may be used to connect a tow-line suitable for towing a water sports participant, such as a wakeboarder. Any suitable tow-line-attachment structure may be used, including but not limited to the integrated light and tow-line-attachment assembly disclosed in U.S. Pat. No. 6,539,886, which is incorporated by reference herein in its entirety.

In the embodiment shown in FIGS. 1-5, the reversible seat 300 is located in the primary seating area 134. The primary seating area 134 is arranged in an u-shaped seating configuration 200, and the reversible seat 300 is positioned in the aft portion of the u-shaped seating configuration 200. The reversible seat 300 is positioned on the centerline 102 with half of the reversible seat 300 on the port side of the centerline 102 and the other half on the starboard side of the centerline 102. Although the reversible seat 300 is shown in these figures within the u-shaped seating configuration 200, it is not so limited, and the reversible seat 300 may be used within any suitable seating configuration or even on its own.

Making up the other portions of the u-shaped seating configuration 200 are a port bench seat 210 and a starboard bench seat 220. The port bench seat 210 extends along an interior of the port side 116 of the hull 110, and the starboard bench seat 220 extends along an interior part of the starboard side 118 of the hull 110. Each of the port bench seat 210 and the starboard bench seat 220 includes a seat bottom 212, 222. The seat bottoms 212, 222 include cushions attached to a structural member, such as a plate or a frame. Preferably, the cushions are constructed from a soft but supportive material, such as triple-density foam, and are covered with a waterproof material, such as premium grade vinyl. Each of the seating surfaces discussed herein (e.g., the various seat bottoms and seatbacks) may have a similar construction to the seat bottoms 212, 222 of the port bench seat 210 and the starboard bench seat 220.

The boat 100 has a deck 160 which includes a floor 162 and seat support structures 164, 166. The seat bottom 212 of the port bench seat 210 is supported by the port bench seat support structure 164, and the seat bottom 222 of the starboard bench seat 220 is supported by the starboard bench seat support structure 166. The support structures 164, 166 are elevated with respect to the floor 162, such that the seat bottoms 212, 222 are at a higher level than the floor 162. In some embodiments, the seat bottoms 212, 222 may lift up to expose a storage compartment within the seat support structures 164, 166.

In the embodiments shown, each of the port bench seat 210 and the starboard bench seat 220 also includes at least two seatbacks 214, 216, 224, 226. One seatback of the port bench seat 210 is a side seatback 214 located along the inner side wall of the port side 116 of the hull 110, and one seatback of the starboard bench seat 220 is a side seatback 224 located along the inner side wall of the starboard side 118 of the hull 110. A person seated on the seat bottom 212, 222 of either the port bench seat 210 or the starboard bench seat 220 with their back against the side seatback 214, 224 may place their feet on the floor 162 and face inboard. The other seatback of each of the port bench seat 210 and the starboard bench seat 220 is an aft seatback 216, 226 located along an aft bulkhead 168 of the primary seating area 134. A person seated on the seat bottom 212, 222 of either the port bench seat 210 or the starboard bench seat 220 with their back against the aft seatback 216, 226 may face forward with their legs up on the seat bottom 212, 222 in a lounge position. Also located within the primary seating area 134 is a captain's chair 230 located at the control console 126. In this embodiment the captain's chair 230 is rotatable to face forward, such as when the boat operator is operating the boat 100, or to face various inboard directions.

Figure 2:
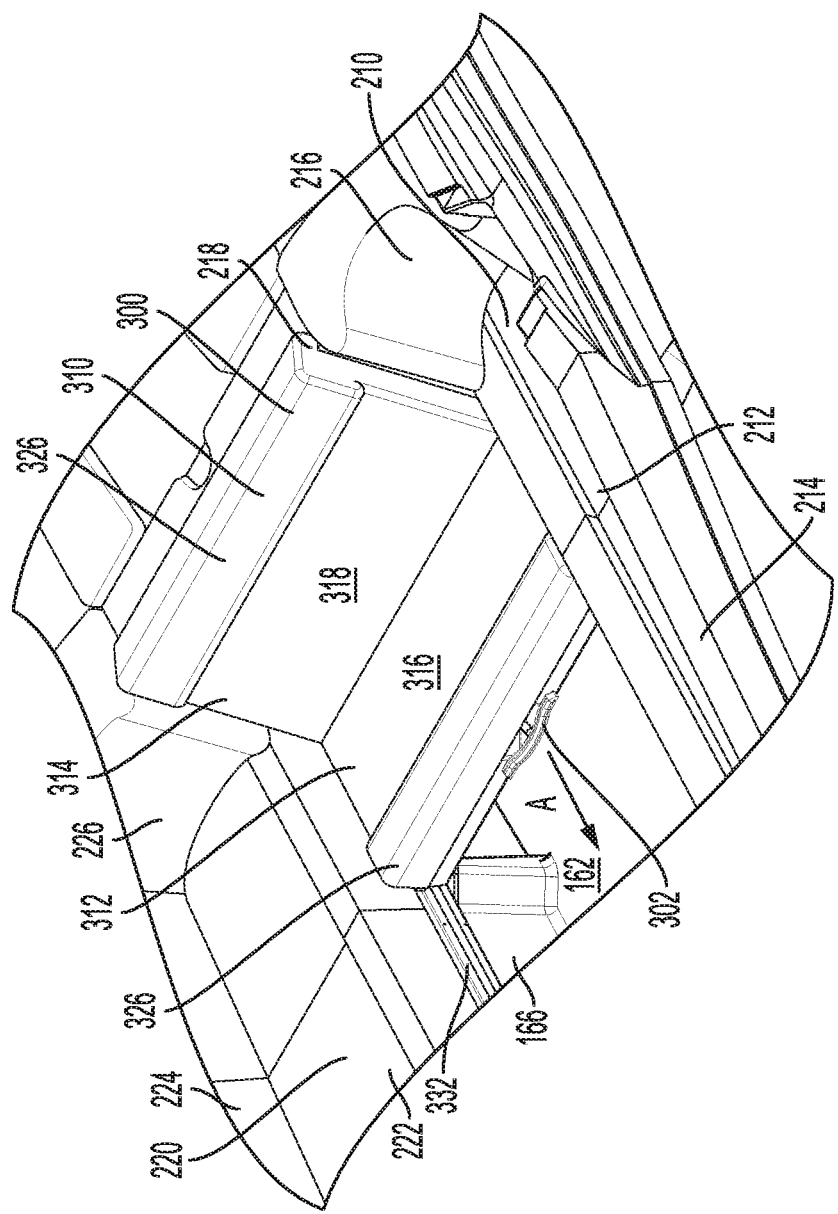
FIG. 2 is another perspective view of a portion of the boat shown in FIG. 1.
Figure 3:
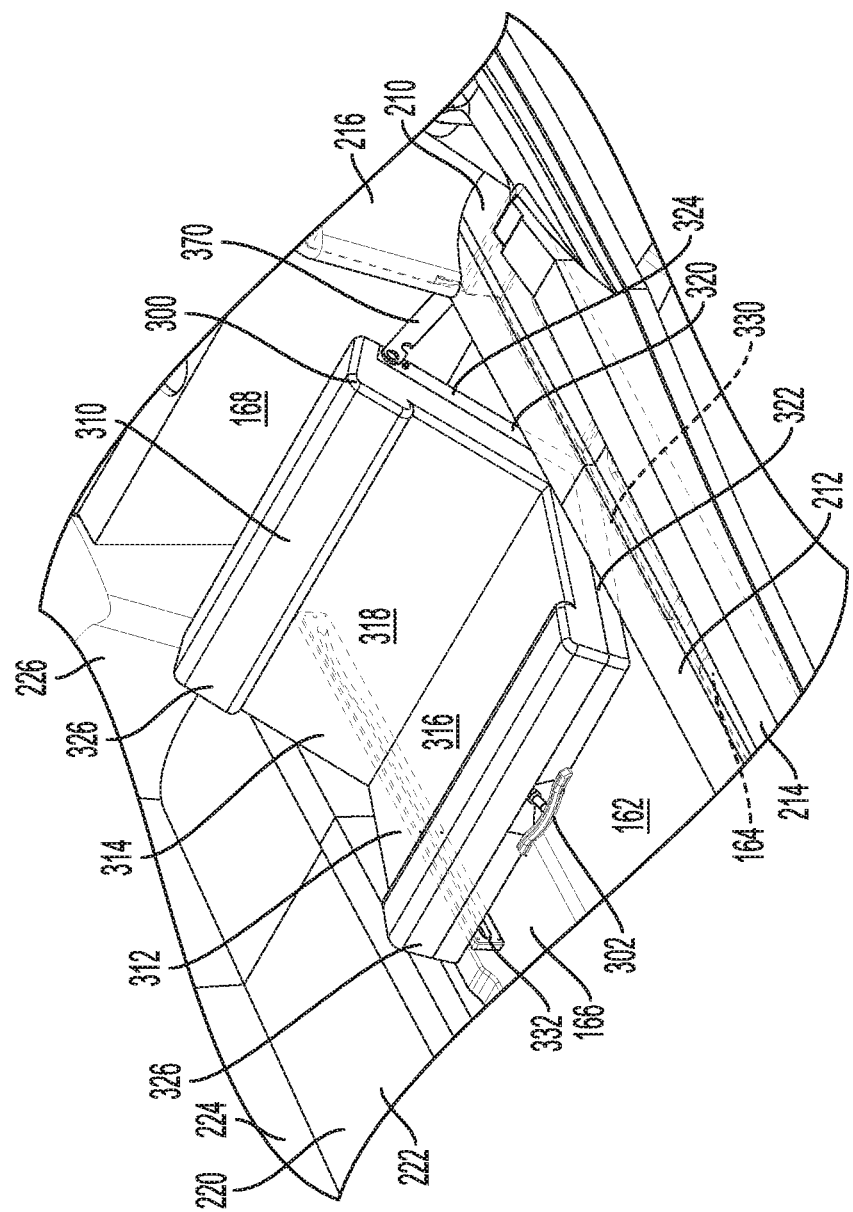
FIG. 3 is the perspective view of the portion of the boat shown in FIG. 2 with the reversible seat in an intermediate configuration.
Figure 4:
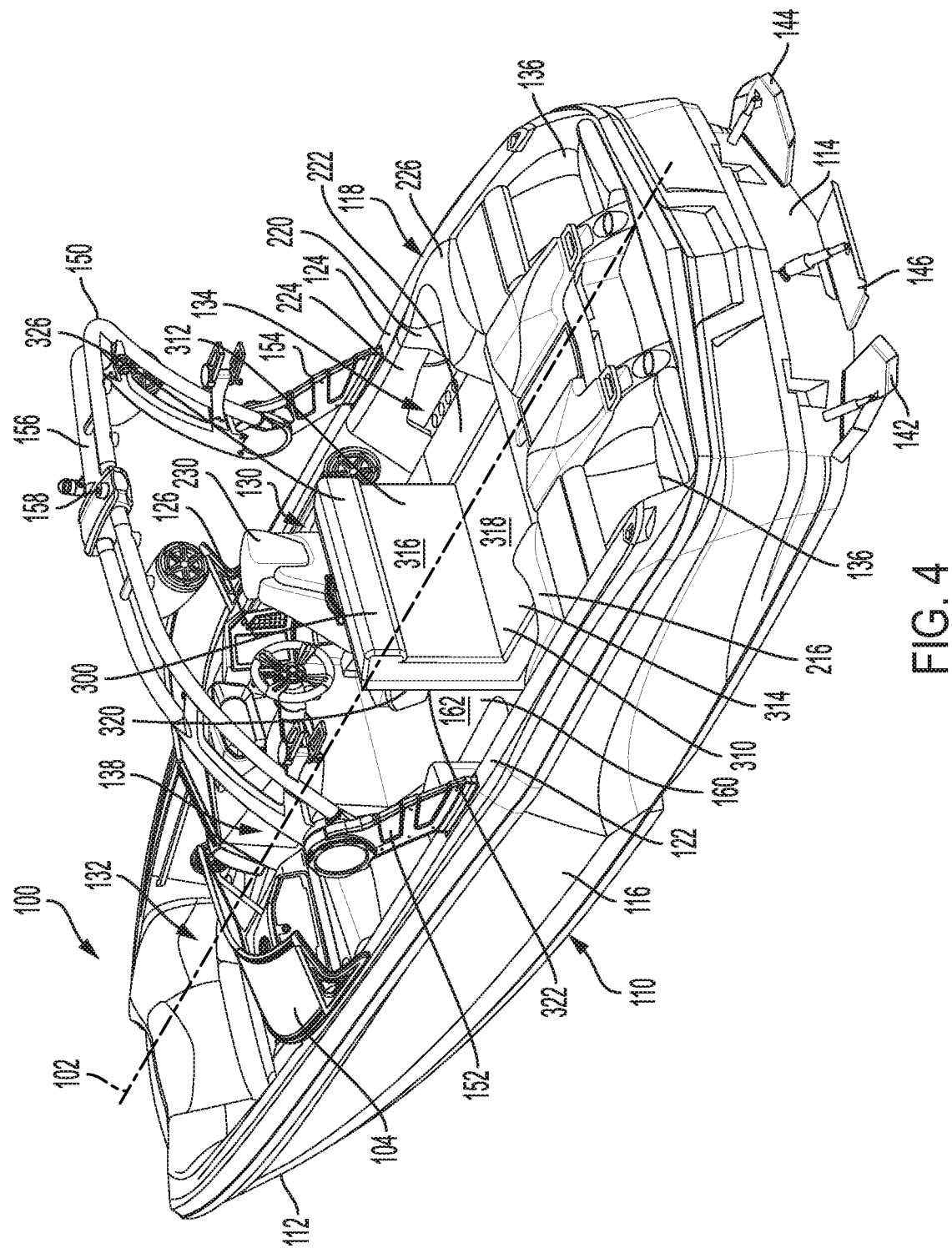
FIG. 4 is the perspective view of the boat as shown in FIG. 1 with the reversible seat in an aft-facing orientation.
Figure 5:
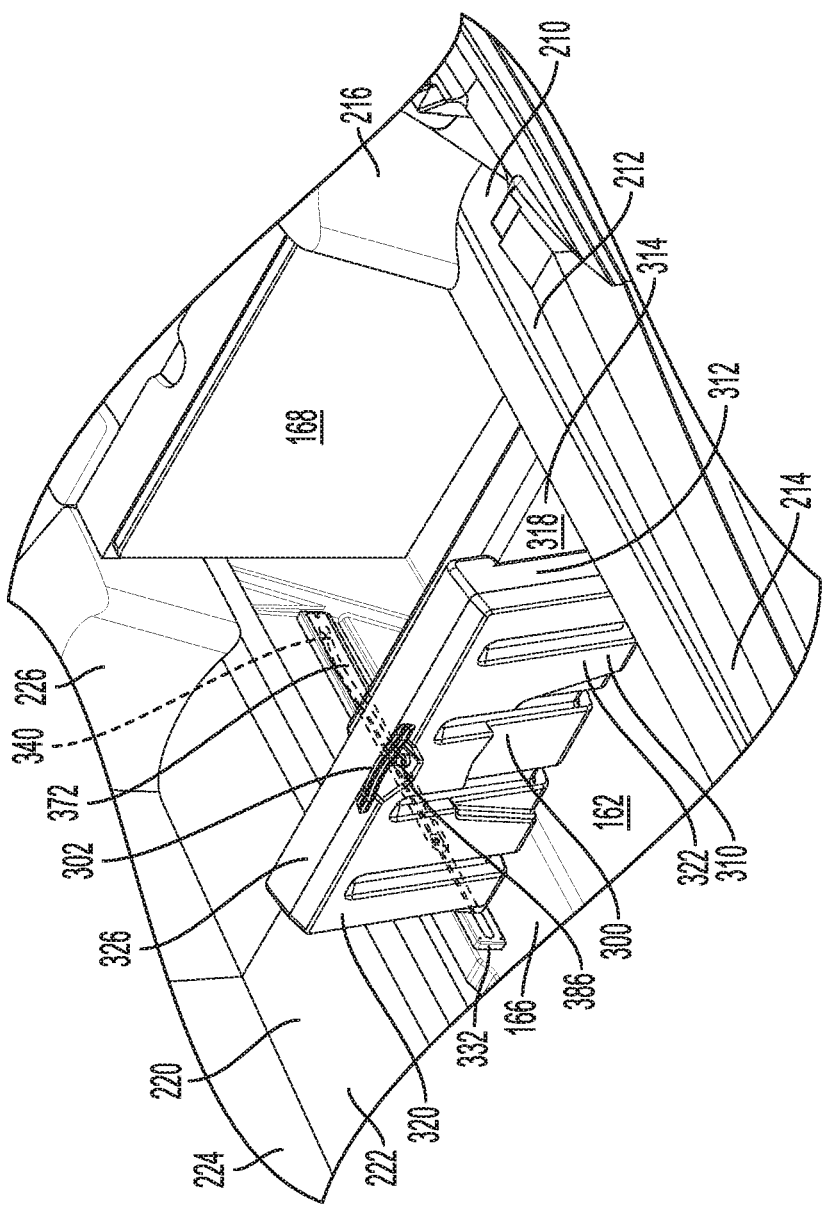
FIG. 5 is the perspective view of the portion of the boat shown in FIG. 2 with the reversible seat in an aft-facing orientation
Figure 6:
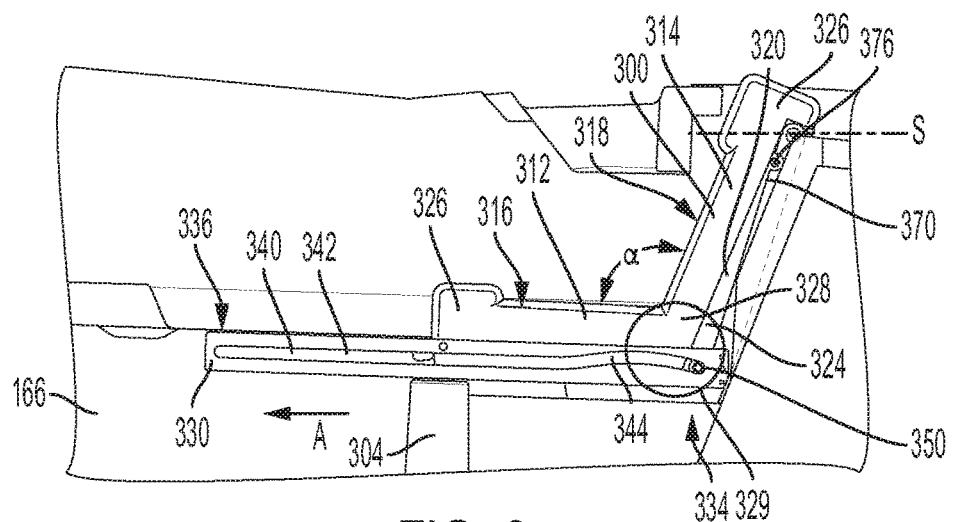
FIG. 6 is a side schematic view of the reversible seat in the forward-facing orientation.
Figure 7:
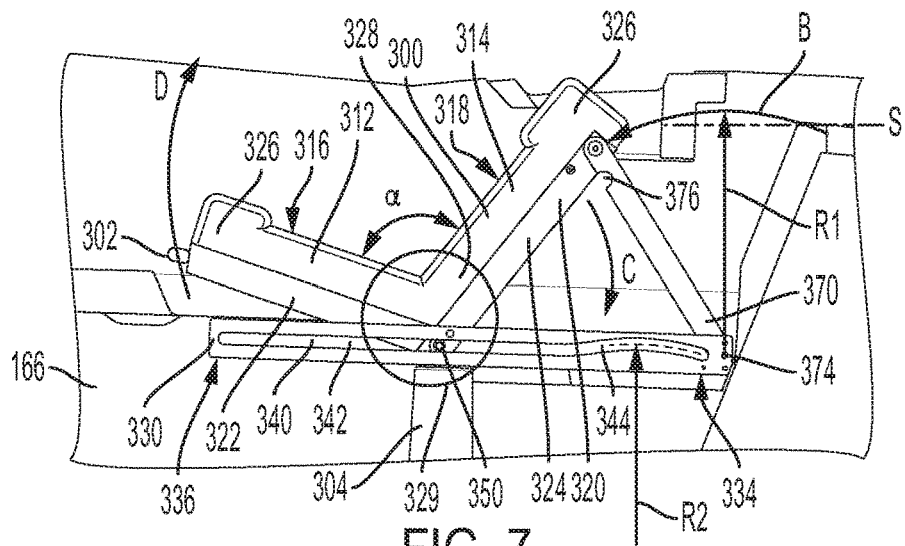
FIG. 7 is a side schematic view of the reversible seat in the intermediate configuration shown in FIG. 3.
Figure 8:
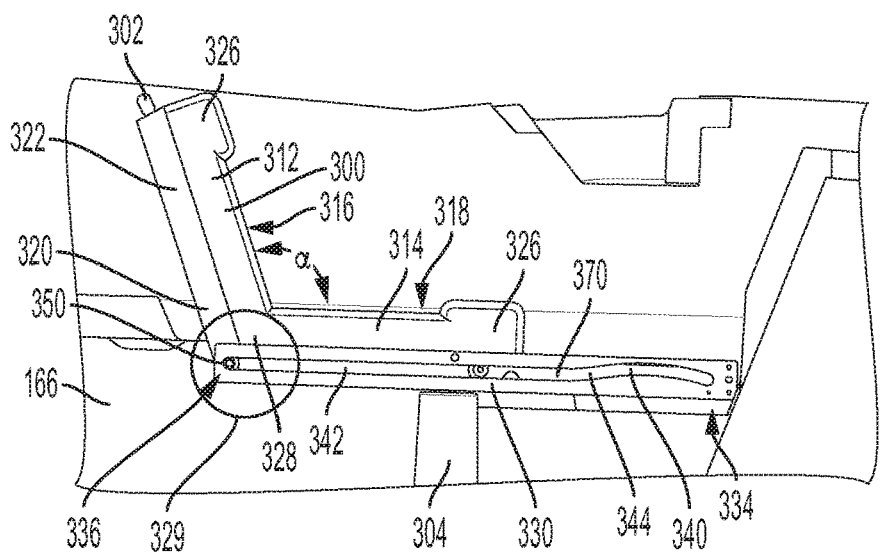
FIG. 8 is a side schematic view of the reversible seat in the aft-facing orientation.

The structure of the reversible seat 300 will now be described in more detail. The reversible seat 300 is reversible between a first orientation and a second orientation. In the preferred embodiment shown herein, the first orientation is a forward-facing orientation and the second orientation is an aft-facing orientation. The invention, however, is not so limited, and the reversible seat 300 may be oriented to face any suitable direction in the vehicle. For example, the first orientation may be a port-facing orientation and the second orientation may be a starboard-facing orientation. FIGS. 1 and 2 show the reversible seat 300 is in its forward-facing orientation, and FIGS. 4 and 5 show the reversible seat 300 in its aft-facing orientation. FIG. 3 shows the reversible seat 300 in an intermediate configuration as it is moved between the forward-facing orientation and the aft-facing orientation, or vice versa. FIGS. 6-8 are side views of the reversible seat 300 with the port bench seat 210 and the port bench seat support structure 164 removed for clarity to show features of the reversible seat 300. In FIGS. 3 and 5, the seat bottoms 212, 222 and seatbacks 214, 216, 224, 226 of the port bench seat 210 and the starboard bench seat 220 are removed for clarity.

The reversible seat 300 includes a seat structure 310. The seat structure 310 has a first member 312 and a second member 314, which form a seat bottom or seatback depending upon the orientation of the reversible seat 300. Each of the first member 312 and the second member 314 includes an exposed surface: a first exposed surface 316 and a second exposed surface 318, respectively. The first exposed surface 316 and the second exposed surface 318 form either a seating surface or seatback depending upon the orientation. In the forward-facing orientation, the first member 312 is the seat bottom, with the first exposed surface 316 being a seating surface, and the second member 314 is the seatback, with the second exposed surface 318 configured to support an occupant's back. In the aft-facing orientation, the second member 314 is the seat bottom, with the second exposed surface 318 being a seating surface, and the first member 312 is the seatback, with the first exposed surface 316 configured to support an occupant's back. The first member 312 and the second member 314 are thus arranged relative to each other such that they form an L-shape, and an angle α formed between the first exposed surface 316 and the second exposed surface 318 is preferably at least 90 degrees and more preferably from 95 degrees to 135 degrees, so that a person can sit comfortably in the reversible seat 300. In this embodiment, the first exposed surface 316 in the forward-facing orientation is approximately parallel to the floor 162 and the second exposed surface 318 in the aft-facing orientation is approximately parallel to the floor 162.

Figure 9:
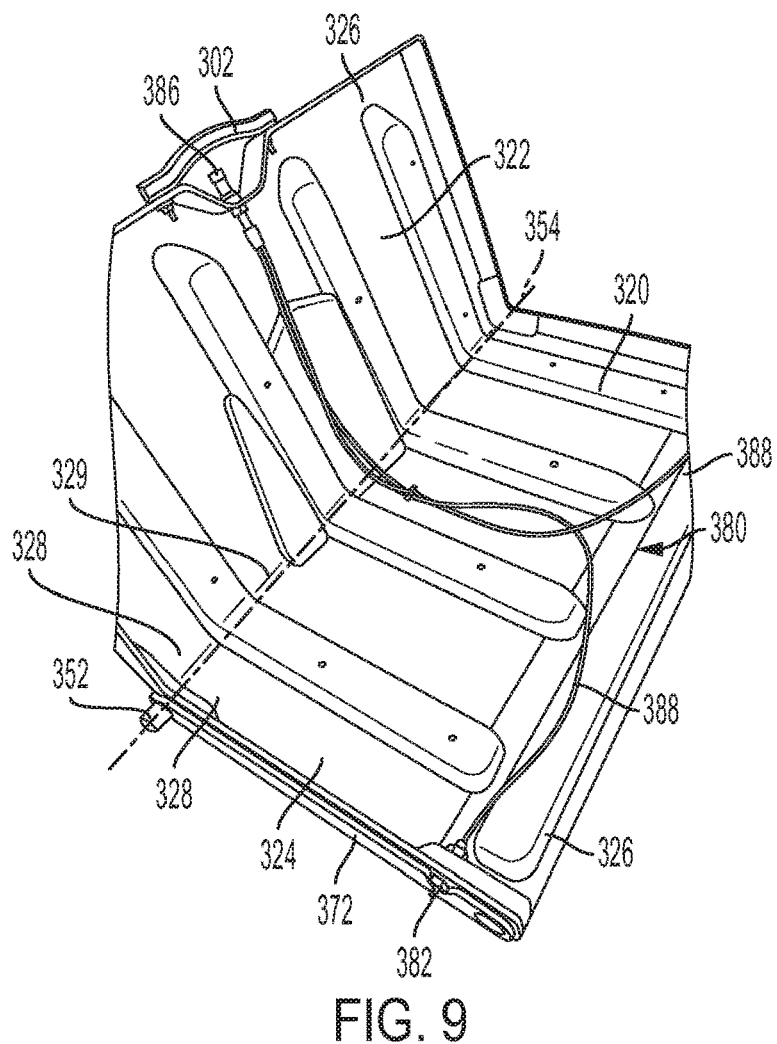
FIG. 9 is a perspective view of a seat structure of the reversible seat with the seat cushions removed.

Each of the first member 312 and the second member 314 also includes a structural member: a first structural member 322 and a second structural member 324, respectively. In this embodiment, the first structural member 322 and the second structural member 324 are an integral member, as can be seen in FIG. 9, and will collectively be referred to herein as the structural member 320 of the seat structure 310. The structural member 320 is formed from fiberglass which is lightweight, but possesses sufficient strength and rigidity to meet the load demands of the seat structure 310. Although the structural member 320 preferably is integrally formed from fiberglass, it is not so limited. The structural member 320 may be formed from any suitable material, and the first structural member 322 and the second structural member 324 may be separate members joined together by any suitable means.

Each of the first member 312 and the second member 314 includes a first end region 326 and a second end region 328. The second end region 328 is also referred to herein as an intersecting region 329 where the first member 312 and the second member 314 join together. The first end region 326 of the first member 312 is a forward portion of the seat structure 310 when the reversible seat 300 is in the forward-facing orientation, and the first end region 326 of the first member 312 is an upper portion of the seat structure 310 when the reversible seat 300 is in the aft-facing orientation. Similarly, the first end region 326 of the second member 314 is the upper portion of the seat structure 310 when the reversible seat 300 is in the forward-facing orientation, and the first end region 326 of the second member 314 is an aft portion of the seat structure 310 when the reversible seat 300 is in the aft-facing orientation.

The reversible seat 300 also includes a pair of supports 330, 332 that support the seat structure 310. One support is a port-side support 330 located on the port side of the seat structure 310 and the other support is a starboard-side support 332 located on the starboard side of the seat structure 310. Although the reversible seat 300 is shown in this embodiment with a pair of supports, any suitable number of supports may be used, including one support or three or more supports. In this embodiment, the port-side support 330 is the same as the starboard-side support 332 and thus the following description of the port-side support 330 also applies to the starboard-side support 332.

The port-side support 330 can be seen most clearly in FIGS. 6-8. The port-side support 330 is formed from a stainless steel bar that is attached to the port bench seat support structure 164. The starboard-side support 332 is similarly attached so the starboard bench seat support structure 166 and the port-side support 330 and the starboard-side support 332 are orientated in parallel with each other. The port-side support 330 may be formed from any suitable structural material or even be formed integrally with the port bench seat support structure 164. The port-side support 330 has a first end 334 and a second end 336. A slot 340 is formed in the port-side support 330 that extends from the first end 334 to the second end 336. The slot 340 has a linear portion 342 and an arcuate portion 344. In this embodiment, the arcuate portion 344 is located on the portion of the slot 340 proximate to the first end 334, and the arc begins at the end of the slot 340 proximate to the first end 334. However, the location of the arcuate portion 344 is not so limited and may be located at the end of the slot 340 proximate to the second end 336 or even both ends.

The seat structure 310 is rotatably connected to the pair of supports 330, 332 by a pair of pivots 350, 352. The seat structure 310 rotates about a pivot axis 354 (see FIGS. 9 and 11a) of the pair of pivots 350, 352 as the reversible seat 300 is moved from the forward-facing orientation to the aft-facing orientation, as will be described further below. One pivot of the pair of pivots is a port-side pivot 350. The port-side pivot 350 is located on the port side of the seat structure 310 and connects the seat structure 310 with the port-side support 330. The other pivot is a starboard-side pivot 352. The starboard-side pivot 352 is located on the starboard side of the seat structure 310 connects the seat structure 310 with the port-side support 330. In this embodiment, the port-side pivot 350 is the same as the starboard-side pivot 352 and thus the following description of the port-side pivot 350 also applies to the starboard-side pivot 352.

Figure 11A:
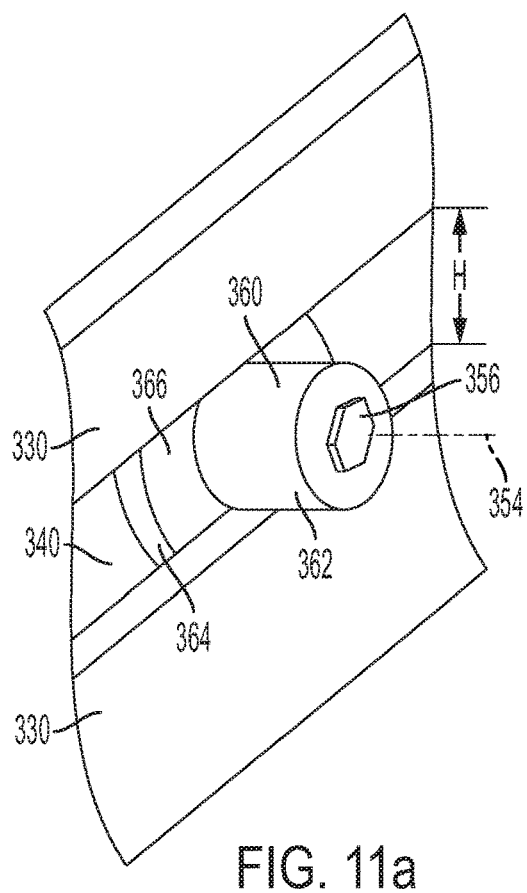
FIG. 11a is a detail view showing a port-side pivot of the reversible seat engaged with a port-side support of the reversible seat.
Figure 11B:
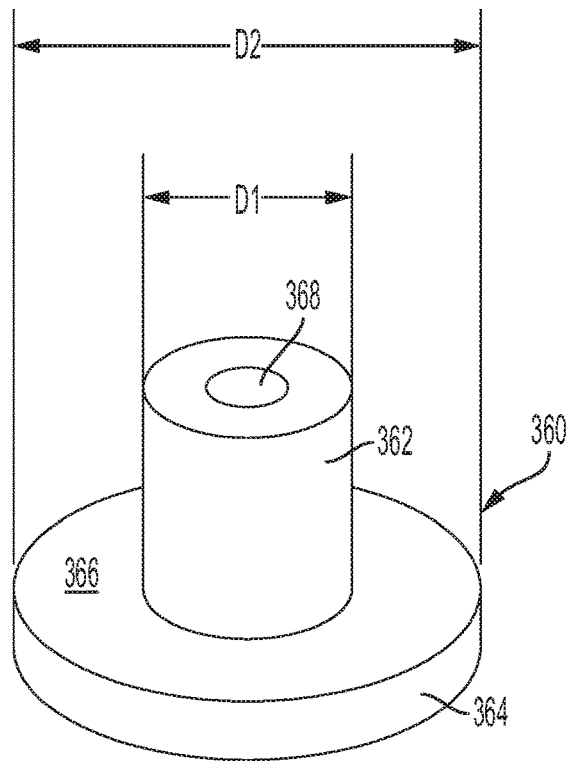
FIG. 11b is a perspective view of a bearing of the port-side pivot.

In this embodiment the port-side pivot 350 engages with the slot 340 of the port-side support 330 with a bearing 360, as can be seen in FIG. 11a. FIG. 11a is a detail view showing the port-side pivot 350 engaged with the slot 340 of the port-side support 330, and FIG. 11b is a perspective view of the bearing 360 the port-side pivot 350. Although any suitable bearing (such as ball bearings, for example) or pivot may be used, the bearing 360 of this embodiment is a cylinder made of polyoxymethylene (e.g., Delrin®) that is sized to slide within the slot 340. Although any suitable bearing material may be used, Delrin® has suitable wear properties for this wear couple, and a good balance of static and kinetic coefficients of friction that provide for secure but easy operation of the reversible seat 300. In this embodiment, the bearing 360 includes a main cylindrical portion 362 that has an outer diameter D1, which is the same as the height H of the slot 340, taking into account appropriate tolerancing. The main cylindrical portion 362 slides and rotates within the slot 340 as the port-side pivot 350 is moved between the first end 334 and the second end 336 of the port-side support 330.

The port-side pivot 350 also includes a flange 364 having an outer diameter D2 larger than the outer diameter of the main cylindrical portion 362 and larger than the height H of the slot 340. The flange 364 has an outboard surface 366 (an upper surface of the flange 364) which provides a bearing surface between the bearing 360 and the inboard surface 338 of the port-side support 330 (see FIG. 10b). In addition, the combination of the flange 364 on the bearing 360 of each of the port-side pivot 350 and the starboard-side pivot 352 positions the seat structure 310 laterally. In this embodiment, the bearing 360 is attached to the structural member 320 in the intersecting region 329. Although any suitable means may be used to connect the bearing 360 to the seat structure 310, in this preferred embodiment, a bolt 356 is inserted through a hole 368 in the center of the bearing 360. The bolt 356 engages with threads, such an insert nut (not shown), formed in the structural member 320.

The reversible seat 300 also includes a pair of moveable arms 370, 372. One moveable arm is a port-side moveable arm 370 located on the port side of the seat structure 310 and the other moveable arm is a starboard-side moveable arm 372 located on the starboard side of the seat structure 310. A non-limiting advantage of the pair of moveable arms 370, 372 is that they are configured to prevent the seat structure 310 from rotating (cocking) relative to the pair of supports 330, 332 and thus help ensure that the seat structure 310 can slide between the first end 334 and the second end 336 without binding. Another non-limiting advantage of the pair of moveable arms 370, 372 is that they help rotate the seat structure 310 as it is moved between the forward-facing orientation and the aft-facing orientation, as will be discussed further below. Although the reversible seat 300 shown in this embodiment has a pair of moveable arms, any suitable number of moveable arms may be used. In this embodiment, the port-side moveable arm 370 is the same as the starboard-side moveable arm 372 and thus the following description of the port-side moveable arm 370 also applies to the starboard-side moveable arm 372. The port-side moveable arm 370 can be seen best in FIGS. 3 and 6-8.

One end of the port-side moveable arm 370 is pivotably connected to the first end region 326 of the second member 314 of the seat structure seat structure 310, and the other end of the port-side moveable arm 370 is pivotable about an axis 374 located on the first end 334 side of the port-side support 330. In this embodiment, the port-side moveable arm 370 is pivotably connected to the first end 334 of the port-side support 330, such that, when the seat structure 310 is in the forward-facing orientation, the port-side moveable arm 370 has approximately that same angle of inclination as the second member 314.

A gap 218 is formed between the aft seatback 216 of the port bench seat 210 and the second member 314 of the reversible seat 300, which is adjacent to the aft seatback 216. The port-side moveable arm 370 is configured, particularly with the angle described above, to be located within the gap 218 and is thus not visible when the reversible seat 300 is in the forward-facing orientation. In addition, the height of the port-side moveable arm 370 is sized such that the port-side moveable arm 370 is inset from the second exposed surface 318, allowing an occupant sitting on the reversible seat 300 or the port bench seat 210, even if they have their back against the gap 218, to not feel the port-side moveable arm 370 because of the thickness of the cushions of the second member 314 and the aft seatback 216.

The operation of the reversible seat 300 in moving from the forward-facing orientation (FIGS. 1, 2, and 6) to the aft-facing orientation (FIGS. 4, 5, and 8) will now be described. A user grasps a handle 302 of the seat structure 310 and pulls the handle 302 forward in direction A. In this embodiment, the handle 302 is located on the first end region 326 of the first member 312. By pulling the handle 302, the seat structure 310 moves forward, and the bearing 360 slides within the slot 340 from the first end 334 toward the second end 336 of the port-side support 330. The end of the port-side moveable arm 370 attached to the first end region 326 of the second member 314 also begins to move forward. As the port-side moveable arm 370 is angled aft in the forward-facing configuration, the end of the port-side moveable arm 370 attached to the first end region 326 of the second member 314 moves forward in an arc (direction B), which first moves upward relative to its starting height S. The port-side moveable arm 370 has a radius R1 of rotation about its axis 374 of rotation, and the arcuate portion 344 of the slot 340 is preferably arced to have a radius R2 that is the same as the radius R1 of the port-side moveable arm 370 to accommodate this upward movement of the port-side moveable arm 370.

FIGS. 3 and 7 show the reversible seat 300 in an intermediate configuration. As the seat structure 310 is moved forward and the bearing 360 slides into the linear portion 342 of the slot 340, the port-side moveable arm 370 begins to restrict the forward movement of the first end region 326 of the second member 314, causing the seat structure 310 to rotate about the pivot axis 354 of the port-side pivot 350. As the seat structure 310 rotates, the first end region 326 of the second member 314 rotates downward in direction C and the first end region 326 of the first member 312 rotates upward in direction D. A user continues to pull the handle 302 in direction C until the seat structure 310 is in the aft-facing position as shown in FIGS. 4, 5, and 8. In this embodiment, a boss 304 is formed in the deck 160 to support the first end region 326 of each of the first member 312 and the second member 314 when used as a seat bottom. The boss 304 also provides a limitation on the rotation of the seat structure 310. In this embodiment, the boss 304 contacts a bottom surface of the structural member 320. To move from the aft-facing orientation to the forward facing orientation, the process is reversed.

Figure 10A:
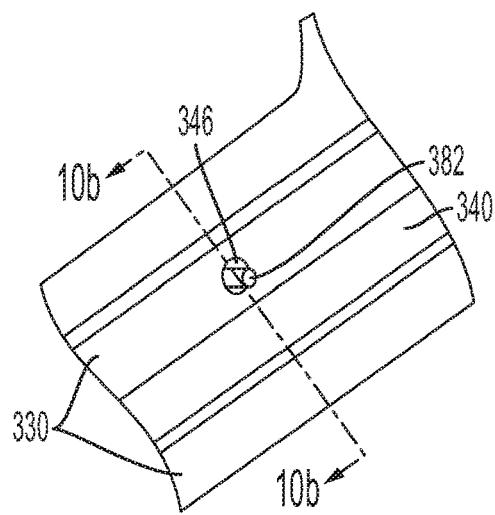
FIG. 10a is a detail view of the port-side support and a latch mechanism for the reversible seat.
Figure 10B:
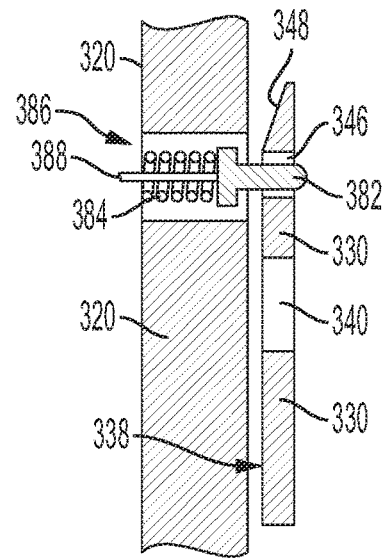

The reversible seat 300 also includes a locking mechanism 380 to lock the reversible seat 300 in at least one of the forward-facing orientation and the aft-facing orientation. FIG. 10a is a detail view of the locking mechanism 380 and port-side support 330, and FIG. 10b is a cross-section view taken along line 10b-10b in FIG. 10a. In this embodiment, the locking mechanism 380 locks the reversible seat 300 in the aft-facing orientation. One non-limiting advantage of the arcuate portion 344 of the slot 340 is that the arcuate portion 344 inhibits inadvertent forward movement of the bearing 360 and thus a locking mechanism is not needed when the reversible seat 300 is in the forward-facing orientation.

Although any suitable locking mechanism 380 may be used, the locking mechanism 380 of this embodiment is a latch-type locking mechanism. The locking mechanism 380 includes a spring-loaded bar, which in this embodiment is a cylindrical pin 382. The pin 382 engages with a hole 346 located in the port-side support 330 and a helical spring 384 biases the pin 382 in an outboard direction to keep the pin 382 engaged with the hole 346. The pin 382 is connected to a handle 386 by a cable 388, and pulling on the handle 386 moves the pin 382 in an inboard direction, compressing the spring 384, to disengage the pin 382 from the hole 346. Once the pin 382 is disengaged from the hole 346, the first end region 326 of the second member 314 can be moved in a direction opposite to direction D to begin moving the seat structure 310 from the aft-facing orientation to the forward-facing orientation.

The port-side support 330 includes a chamfer 348 located above the hole 346. When moving the seat structure 310 from the forward-facing orientation to the aft-facing orientation, the chamfer 348 pushes the pin 382 in the inboard direction (compressing the spring 384) as the first end region 326 of the second member 314 is moved in direction C. When the seat structure 310 is in the aft-facing orientation, the pin 382 is aligned with the hole 346 and the spring 384 pushes the pin 382 in the outboard direction to engage the pin 382 with the hole 346 and lock the seat structure 310 in the aft-facing orientation. The pin 382 and spring 384 are housed within the structural member 320. The port-side moveable arm 370 includes a notch 376 so that the pin 382 does not interfere with the port-side moveable arm 370 when the seat structure 310 is in the forward-facing orientation.

As can be seen in FIG. 9, the handle 386 is attached to structural member 320 at the first end region 326 of the second member 314, and the handle 386 operates two pins 382, one on the port side of the seat structure 310 and one on the starboard side of the seat structure 310. FIG. 9 is a perspective view of the seat structure 310 with the cushions removed to show the structural member 320 and portions of the locking mechanism 380. Although the locking mechanism 380 has been described relative to the port-side support 330 and the pin 382 on the port side, the locking mechanism 380 of this embodiment includes the same features on the starboard side.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A reversible seat for a vehicle, the reversible seat comprising:

a seat structure moveable between a first orientation facing a first direction and a second orientation facing a second direction that is opposite the first direction, the seat structure including:
- (a) a first member configured to be (i) a seat bottom in the first orientation and (ii) a seatback in the second orientation; and
- (b) a second member configured to (i) be a seatback in the first orientation and (ii) a seat bottom in the second orientation;

a support having a slot formed therein, the slot having a first end and a second end, the slot having a linear portion and an arcuate portion connected to the linear portion, the arcuate portion being (i) a portion of the slot proximate at least one of the first end and the second end, (ii) positioned such that the arcuate portion is arched upward relative to the linear portion of the slot, and (iii) oriented to be convex in the upward direction; and a pivot connected to the seat structure and engaged with the slot and moveable between the first end of the slot and the second end of the slot, the seat structure being rotatable about a pivot axis of the pivot, wherein the seat structure is configured to move from the first orientation to the second orientation by moving the pivot from the first end of the slot towards the second end of the slot and rotating the seat structure about the pivot axis of the pivot, and wherein the seat structure is configured to move from the second orientation to the first orientation by moving the pivot from the second end of the slot towards the first end of the slot and rotating the seat structure about the pivot axis of the pivot.

2. The reversible seat of claim 1, wherein the pivot is a bearing engaged with the slot such that the bearing slides within the slot.

3. The reversible seat of claim 1, wherein the first member intersects with the second member in an intersecting region to form an L-shape.

4. The reversible seat of claim 3, wherein the pivot axis of the pivot passes through the intersecting region.

5. The reversible seat of claim 3, wherein each of the first member and the second member has an exposed surface, the exposed surface of the first member being a seating surface when the seat structure is in the first orientation, and the exposed surface of the second member being a seating surface when the seat structure is in the second orientation, and
wherein an angle formed between the exposed surfaces of each of the first member and the second member is from 95 degrees to 135 degrees.

6. The reversible seat of claim 5, wherein the pivot axis of the pivot passes through the intersecting region,
wherein the second member of the seat structure includes a first-end region and a second-end region, the second-end region of the second member being the intersecting region, and
wherein the reversible seat further comprises a moveable arm, the moveable arm being pivotably connected to the first-end region of the second member of the seat structure, the moveable arm being pivotable about an axis located on the first end side of the slot of the support.

7. The reversible seat of claim 6, wherein the moveable arm has a radius of rotation about the axis located on the first end side, and the arcuate portion of the slot has a radius that is the same as the radius of rotation of the moveable arm.

8. The reversible seat of claim 1, further comprising a locking mechanism configured to lock the seat structure in at least one of the first orientation and the second orientation.

9. The reversible seat of claim 8, wherein the support further includes a hole formed therein and the locking mechanism is a latch configured to engage with the hole to lock the seat structure in either the first orientation or the second orientation.

10. The reversible seat of claim 9, wherein the latch includes a spring-loaded bar configured to engage with the hole.

11. A reversible seat for a vehicle, the reversible seat comprising:
a seat structure moveable between a first orientation facing a first direction and a second orientation facing a second direction that is opposite the first direction, the seat structure including:
- (a) a first member configured to be (i) a seat bottom in the first orientation and (ii) a seatback in the second orientation; and
- (b) a second member configured to (i) be a seatback in the first orientation and (ii) a seat bottom in the second orientation;

a pair of supports each having a slot formed therein, each of the slots extending in a direction that is parallel to each other, each slot having (i) a first end, (ii) a second end, (iii) a linear portion, and (iv) an arcuate portion connected to the linear portion, the arcuate portion being a portion of the slot proximate the first end, the arcuate portion being positioned such that the arcuate portion is arched upward relative to the linear portion of the slot and oriented to be convex in the upward direction; and a pair of pivots connected to the seat structure and having a pivot axis about which the seat structure is rotatable, each pivot being engaged with the slot of one of the pair of supports and being moveable between the first end of the corresponding slot and the second end of the corresponding slot, wherein the seat structure is configured to move from the first orientation to the second orientation by moving the pair of pivots from the first end of each of the slots towards the second end of each of the slots and rotating the seat structure about the pivot axis of the pair of pivots, and wherein the seat structure is configured to move from the second orientation to the first orientation by moving the pair of pivots from the second end of each of the slots towards the first end of each of the slots and rotating the seat structure about the pivot axis of the pair of pivots.

12. The reversible seat of claim 11, wherein each pivot of the pair of pivots is a bearing engaged with the slot such that the bearing slides within the slot.

13. The reversible seat of claim 11, wherein the first member intersects with the second member in an intersecting region to form an L-shape.

14. The reversible seat of claim 11, wherein each of the first member and the second member has an exposed surface, the exposed surface of the first member being a seating surface when the seat structure is in the first orientation, and the exposed surface of the second member being a seating surface when the seat structure is in the second orientation, and
wherein an angle formed between the exposed surfaces of each of the first member and the second member is from 95 degrees to 135 degrees.

15. The reversible seat of claim 11, wherein the second member of the seat structure includes an end region, the end region being an upper portion of the second member when the seat structure is in the first orientation, and wherein the reversible seat further comprises a pair of moveable arms, one of the pair of moveable arms being pivotably connected to one side of the end region of the second member and the other one of the pair of moveable arms being pivotably connected to the other side of the end region of the second member, each moveable arm being pivotable about an axis located on the first end side of each of the slots of the pair of supports.

16. The reversible seat of claim 15, wherein each of the moveable arms has a radius of rotation about the corresponding axis located on the first end side, and the arcuate portion of the slots in each of the pair of supports has a radius that is the same as the radius of rotation of a corresponding one of the pair of moveable arms.

17. The reversible seat of claim 11, further comprising a locking mechanism configured to lock the seat structure in at least one of first orientation and the second orientation.

18. A boat comprising:

a hull including a bow, and port and starboard sides; and a reversible seat, the reversible seat including:
  a seat structure moveable between a forward-facing orientation and an aft-facing orientation facing, the seat structure including:
    (a) a first member configured to be (i) a seat bottom in the forward-facing orientation and (ii) a seatback in the aft-facing orientation; and
    (b) a second member configured to (i) be a seatback in the forward-facing orientation and (ii) a seat bottom in the aft-facing orientation, the second member having an end region, the end region being an upper portion of the second member when the seat structure is in the forward-facing orientation;
  a pair of supports each having a slot formed therein, one support of the pair of supports being a port-side support located on the port side of the seat structure, another support of the pair of supports being a starboard-side support located on the starboard side of the seat structure, each of the slots extending in a fore and aft direction of the boat, each slot having (i) a first end, (ii) a second end, and (iii) an arcuate shape over a portion of the slot proximate the first end;
  a pair of pivots having a pivot axis about which the seat structure is rotatable, one pivot of the pair of pivots being a port-side pivot located on the port side of the seat structure, another pivot of the pair of pivots being a starboard-side pivot located on the starboard side of the seat structure, each pivot being engaged with the slot of one of the pair of supports and being moveable between the first end of the corresponding slot and the second end of the corresponding slot; and
  a pair of moveable arms, one of the pair of moveable arms being a port-side moveable arm pivotably connected to a port side of the end region of the second member, another one of the pair of moveable arms being a starboard-side moveable arm pivotably connected to a starboard side of the end region of the second member, each moveable arm being pivotable about an axis located on the first end side of each of the slots of the pair of supports, wherein the seat structure is configured to move from the forward-facing orientation to the aft-facing orientation by moving the pair of pivots from the first end of each of the slots towards the second end of each of the slots and rotating the seat structure about the pivot axis of the pair of pivots, and wherein the seat structure is configured to move from the aft-facing orientation to the forward-facing orientation by moving the pair of pivots from the second end of each of the slots towards the first end of each of the slots and rotating the seat structure about the pivot axis of the pair of pivots.

19. The boat of claim 18, wherein each of the first member and the second member has an exposed surface, the exposed surface of the first member being a seating surface when the seat structure is in the forward-facing orientation, and the exposed surface of the second member being a seating surface when the seat structure is in the aft-facing orientation, and wherein an angle formed between the exposed surfaces of each of the first member and the second member is from 95 degrees to 135 degrees.

20. The boat of claim 18, wherein the port-side moveable arm has a radius of rotation about the corresponding axis located on the first end side, and the arcuate portion of the slot located in the port-side support has a radius that is the same as the radius of rotation of the port-side moveable arm, and wherein the starboard-side moveable arm has a radius of rotation about the corresponding axis located on the first end side, and the arcuate portion of the slot located in the starboard-side support has a radius that is the same as the radius of rotation of the starboard-side moveable arm.

21. The boat of claim 18, further comprising:

a port-side seat located on the port side of the reversible seat, the port-side seat having a seatback, wherein, when the seat structure is in the forward-facing orientation, a port-side gap is formed between the seatback of the port-side seat and the second member of the seat structure and the port-side moveable arm is located in the port-side gap; and a starboard-side seat located on the starboard side of the reversible seat, the starboard-side seat having a seatback, wherein, when the seat structure is in the forward-facing orientation, a starboard-side gap is formed between the seatback of the starboard-side seat and the second member of the seat structure and the starboard-side moveable arm is located in the starboard-side gap.

22. The boat of claim 18, wherein the reversible seat further includes a locking mechanism configured to lock the seat structure in at least one of forward-facing orientation and the aft-facing orientation.

* * * * *